United States Patent
Chiba (10) Patent No.: US 10,725,617 B2
(45) Date of Patent: Jul. 28, 2020

(54) INFORMATION PROCESSING APPARATUS, CONTROL METHOD FOR THE SAME, AND STORAGE MEDIUM FOR COLLECTIVELY CHANGING A PLURALITY OF SETTING VALUES

(71) Applicant: CANON KABUSHIKI KAISHA, Tokyo (JP)

(72) Inventor: Shinichi Chiba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 182 days.

(21) Appl. No.: 15/359,274

(22) Filed: Nov. 22, 2016

(65) Prior Publication Data

US 2017/0153775 A1  Jun. 1, 2017

(30) Foreign Application Priority Data

Nov. 26, 2015  (JP) ................. 2015-230274

(51) Int. Cl.
| | |
|---|---|
| H04N 1/00 | (2006.01) |
| G06F 3/048 | (2013.01) |
| G06F 3/0482 | (2013.01) |
| G06F 3/0484 | (2013.01) |

(52) U.S. Cl.
CPC ........ *G06F 3/0482* (2013.01); *G06F 3/04847* (2013.01); *H04N 1/00389* (2013.01); *H04N 1/00416* (2013.01); *H04N 2201/0094* (2013.01)

(58) Field of Classification Search
CPC .... G06F 3/04847; G06F 3/0482; G06F 3/048; H04N 1/00389; H04N 1/00416; H04N 2201/0094; H04N 1/00
See application file for complete search history.

(56) References Cited

U.S. PATENT DOCUMENTS

| 8,508,761 B2* | 8/2013 | Hirakawa | G06K 15/00 |
| | | | 358/1.14 |
| 2002/0067491 A1* | 6/2002 | Minagawa | G06F 3/04847 |
| | | | 358/1.2 |
| 2010/0211415 A1* | 8/2010 | Tholl | G06Q 40/00 |
| | | | 705/4 |

(Continued)

FOREIGN PATENT DOCUMENTS

| JP | 2009-104386 A | 5/2009 |
| JP | 2010-097454 A | 4/2010 |
| JP | 2011-113533 A | 6/2011 |

OTHER PUBLICATIONS

Wikibooks, Windows Programming/Dialog Boxes, Aug. 24, 2014.*

*Primary Examiner* — Mahelet Shiberou
(74) *Attorney, Agent, or Firm* — Canon U.S.A., Inc. IP Division (57) ABSTRACT

A user interface is provided which expressly specifies items to be changed in accordance with the change of a setting value of one item, and collectively reflects or abandons a plurality of entered setting values. An information processing apparatus continuously accepts a plurality of the setting values to be collectively changed when it is determined that the selected setting item is a specific item to be collectively changed, in the case where change of the setting value is instructed through the menu, and collectively rewrite a plurality of setting values stored in the storage to a plurality of accepted setting values, when a button for reflecting a plurality of accepted setting values displayed on the display unit is selected.

6 Claims, 5 Drawing Sheets (56) References Cited

U.S. PATENT DOCUMENTS

| | | | |
|---|---|---|---|
| 2010/0315674 A1* | 12/2010 | Shimizu | G06F 3/1204 358/1.15 |
| 2012/0075669 A1* | 3/2012 | Takiguchi | G06F 3/1204 358/1.15 |
| 2012/0086975 A1* | 4/2012 | Ozaki | G06F 3/1219 358/1.15 |
| 2012/0206762 A1* | 8/2012 | Minagawa | G06F 3/1204 358/1.15 |
| 2012/0260039 A1* | 10/2012 | Yao | G06F 11/1456 711/115 |
| 2012/0311469 A1* | 12/2012 | Kunori | G06F 3/04845 715/762 |
| 2013/0100474 A1* | 4/2013 | Ono | H04N 1/00474 358/1.13 |
| 2013/0215461 A1* | 8/2013 | Yasukawa | H04N 1/00408 358/1.15 |
| 2014/0092405 A1* | 4/2014 | Park | G06F 3/1205 358/1.9 |
| 2015/0244885 A1* | 8/2015 | Koike | H04N 1/00477 358/1.9 |
| 2015/0355916 A1* | 12/2015 | Inoue | G06F 9/44505 713/100 |

\* cited by examiner

THE CHANGE CANNOT
BE PROCESSED
AT THIS MOMENT.

INFORMATION PROCESSING APPARATUS, CONTROL METHOD FOR THE SAME, AND STORAGE MEDIUM FOR COLLECTIVELY CHANGING A PLURALITY OF SETTING VALUES

BACKGROUND

Field of the Disclosure

The present disclosure relates to an information processing apparatus, a control method for the same, and storage medium.

Description of the Related Art

Recently launched multi-function peripherals and printers mostly have a monitor with a higher display performance like the one that personal computers (PCs) have. The monitor displays graphics such as windows, icons, and buttons on the screen.

However, since a display unit of such a monitor is, for instance, around 7 to 10 inch in size, the monitor is not suitable for a small multi-function peripheral and printer in view of the balance with the device main body.

If a balance should be stricken between the monitor and the device main body, the body size is increased and the advantage as a small product is lost.

A smaller monitor with the higher display performance is available. However, the higher component cost for the smaller monitor does not allow these small products to become competitive in the market. For this reason, these small products tend to adopt a smaller size and lower cost monitor with low display performance.

In many printers, a monitor is used to check a print job information, change and check printer setting values, and give relevant notification to the user. For the purpose of increasing user convenience, Japanese Unexamined Patent Application Publication No. 2009-104386 discusses a conventional technology which automatically reconfigures a specific setting value regarding a change of a printer setting value.

In the case of changing setting values of a printer main body, the user needs to operate the monitor to determine and reflect a setting value for each setting item one by one.

For instance, when the user wants to return a setting value due to the inadequacy of once changed setting value, the user needs to repeat the procedure identical to the setting procedure.

Further, since the small monitor has a limitation in displaying information at a time, that limitation increases the number of operations and complicates the user's operations.

Moreover, one setting value and another setting value may be the values of the identical function, and a plurality of setting values may have to be collectively changed when the change is carried out. In such a case, conventional technologies have a problem in that returning one setting value causes the user to return another setting value by following the identical procedure which takes time and work of the user.

SUMMARY

The present disclosure is directed to providing a mechanism capable of producing a user interface which specifies items to be changed when a setting value of one item is changed, and which reflects or abandons a plurality of entered setting values in a collective manner.

The information processing apparatus according to the present disclosure includes configurations illustrated below.

The information processing apparatus according to the present disclosure includes a display unit configured to display a menu, a retaining unit configured to retain a predetermined setting value, and a determining unit configured to determine whether a selected setting item is a specific item to be collectively changed, in the case where change of the setting value is instructed through the menu. Further, the information processing apparatus includes an acceptance unit configured to continuously accept a plurality of the setting values to be collectively changed in the case where the determining unit determines that the setting item is the specific item, and an updating unit configured, when a button for reflecting a plurality of accepted setting values displayed on the display unit is selected, to collectively rewrite a plurality of setting values retained in the retaining unit to the plurality of accepted setting values.

Further features of the present disclosure will become apparent from the following description of exemplary embodiments (with reference to the attached drawings).

DESCRIPTION OF THE EMBODIMENTS

One or more aspect for carrying out the present disclosure will be described with reference to the figures. Following embodiments do not limit the disclosure according to the scope of the claims, and it is not always required that all combinations of features described in the embodiments are necessary for the solution of the disclosure.

<Description of the System Configuration>

Figure 1:
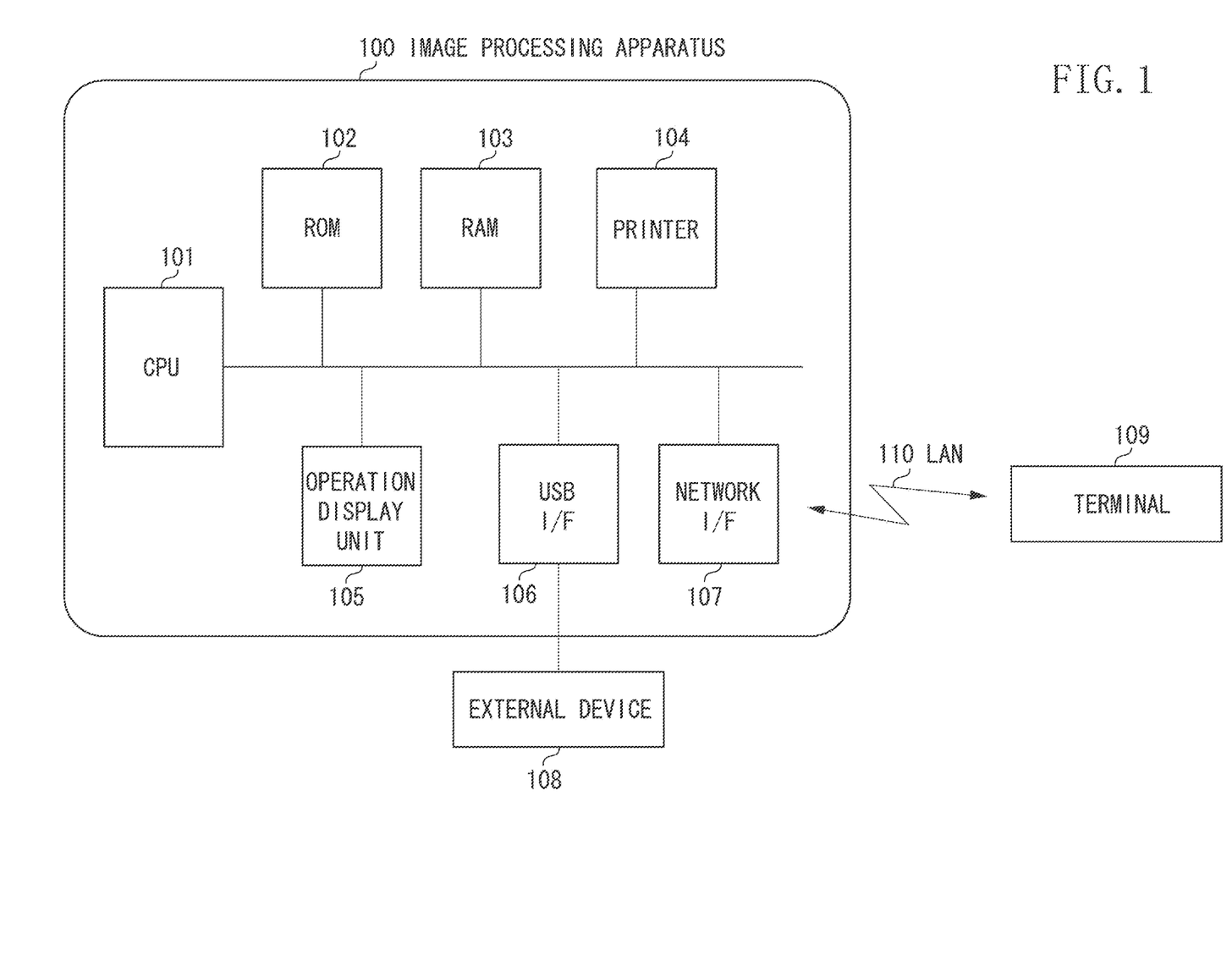
FIG. 1 is a block diagram showing a configuration of a system including an image processing apparatus according to one or more aspect of the present disclosure.

FIG. 1 is a block diagram showing the configuration of a system including an image processing apparatus according to one or more aspect of the present disclosure. Information processing apparatuses to which the present disclosure is applicable include an image processing apparatus, printer, facsimile, and scanner.

In FIG. 1, an image processing apparatus 100 has a central processing unit (CPU) 101, a read-only memory (ROM) 102, a random-access memory (RAM) 103, a printer 104, and an operation display unit 105. Further, the image processing apparatus 100 includes a Universal Serial Bus (USB) I/F 106 and a network I/F 107 as a communication interface with external devices. The CPU 101 is a system control unit which controls the entire image processing apparatus 100.

The ROM 102 stores a control program for controlling the CPU 101. The control program executes the above mentioned embodiments which will be described in detail below. Further, the ROM 102 is a medium such as a rewritable flash ROM that stores data such as setting values and management data which the user of the image processing apparatus 100 registers.

The RAM 103 stores an execution program, program control variables, buffers for various works, a part of setting values, management data and so forth which the user of the image processing apparatus 100 registers. The printer 104 prints received images and file data on the print paper.

The operation display unit 105 includes a keyboard, a touch panel, a liquid crystal display (LCD), and a light-emitting diode (LED). The operation display unit 105 receives various user operations, display an operation screen, and issues notification to the user. Further, the operation display 105 includes physical operation keys (not shown) such as an OK key and a key for returning to the previous operation screen. "Authentication" or "determination" is instructed through the OK key in accordance with the user operation. The USB I/F 106 connects and communicates with a USB device 108, performs power supply to the USB device 108, and the like. In addition, the operation display unit 105 is configured of units of several lines, and displays settings necessary for the operation, messages, status, and generated buttons on the display position configured of the units of lines. Additionally, display processing is controlled by the CPU 101 in accordance with the input or selected information.

The network I/F 107 performs data transmission/reception with external devices through a local-area network (LAN) 110. In particular, the network I/F 107 receives a print job and control information for the image processing apparatus 100 from a terminal 109. The LAN 110 performs cable communication (wired LAN) and radio communication (wireless LAN).

Figure 2A:
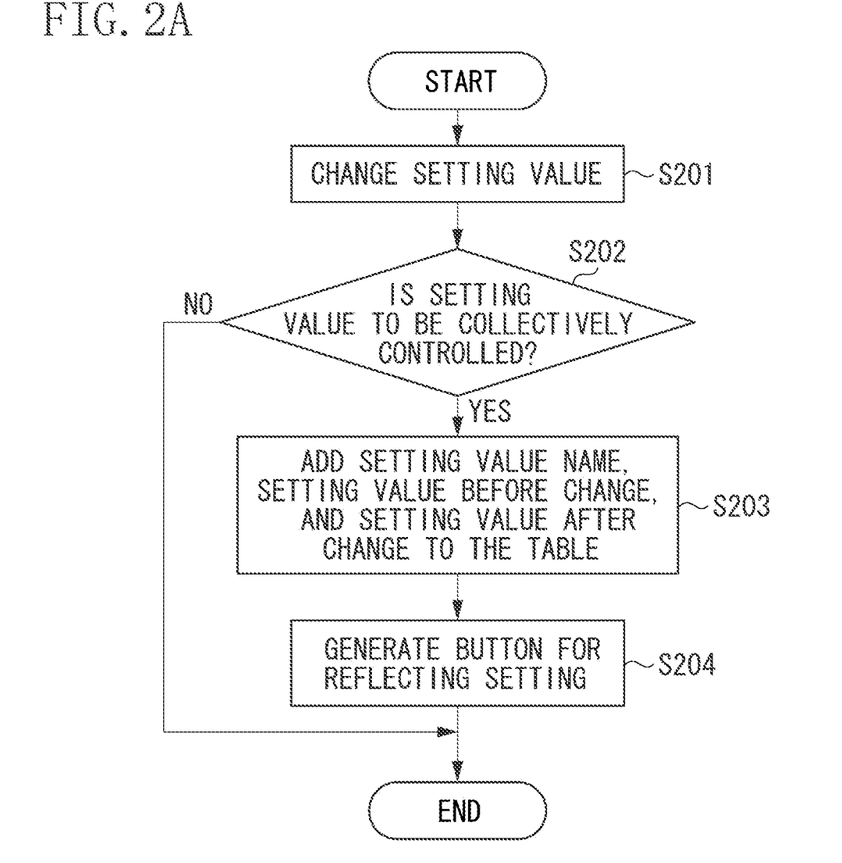
FIGS. 2A and 2B are diagrams illustrating a control method of the image processing apparatus according to one or more aspect of the present disclosure.
Figure 2B:
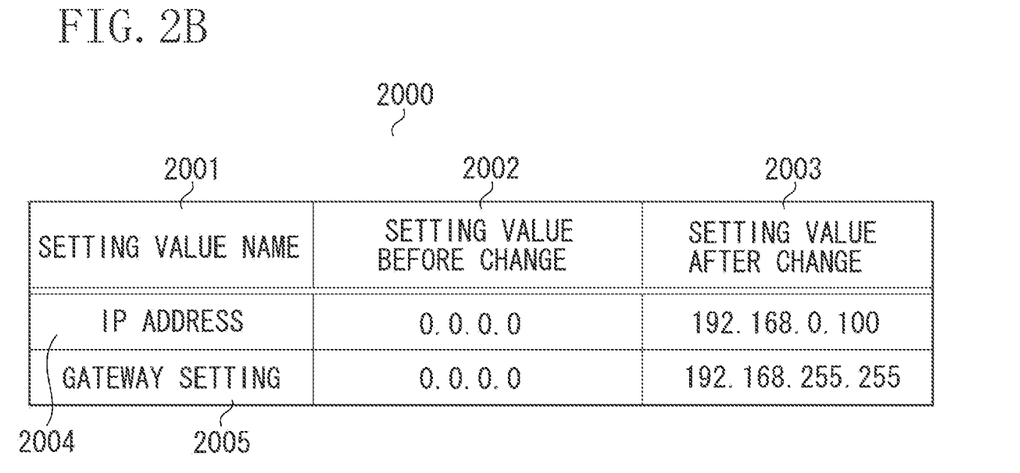

FIG. 2 is a diagram illustrating a control method of the image processing apparatus according to one or more aspect of the present disclosure. Specifically, FIG. 2 A is a flowchart illustrating a control method of the image processing apparatus, and FIG. 2 B shows an example table for storing specific setting items. Each step is performed by the CPU 101 executing a control program stored in the ROM 102. The process performed when the setting value change is instructed through the displayed menu will be precisely described below.

In step S201, the CPU 101 in the image processing apparatus 100 receives a user instruction of changing a setting value of a setting item. In step S202, the CPU 101 determines whether the setting item is to be collectively controlled. When the CPU 101 determines that the setting item is to be collectively controlled (Yes in step S202), in step S203, the CPU 101 adds setting item information to a setting value management table 2000 shown on FIG. 2 B. Then, in step S204, the CPU 101 generates a button for executing "reflecting setting", on a specific position, and terminates the process.

In the case when the CPU 101 determines that the setting item is not to be collectively controlled (No in step S202), data is not added to the setting value management table 2000 and the process is terminated.

In FIG. 2B, the setting value management table 2000 manages predetermined setting items to be collectively set in the image processing apparatus according to the present embodiment. The status of the device shown in FIG. 2B is a status before collectively reflecting the setting items and after user's setting value change operation.

As an example, an IP address 2004 and a gateway setting 2005 are registered in the setting value management table 2000. The setting value management table 2000 manages a setting value name 2001, a setting value before change 2002, and a setting value after change 2003, each of which is an attribute of the setting items.

Figure 3:
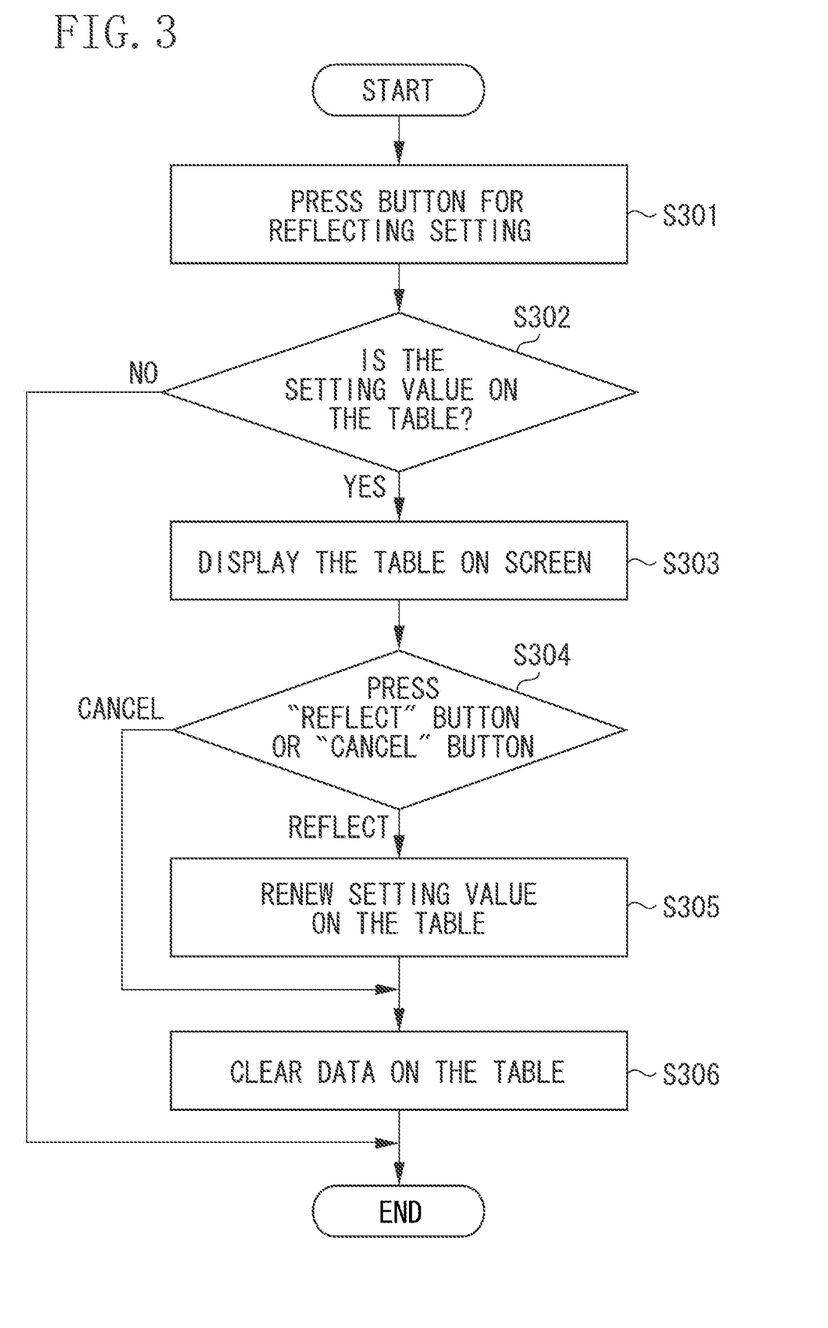
FIG. 3 is a flowchart illustrating a control method of the image processing apparatus according to one or more aspect of the present disclosure.

FIG. 3 is a flowchart illustrating a control method of the image processing apparatus according to one or more aspect of the present disclosure. The flowchart shows a control example in which the change and cancel are collectively executed in the case of changing a specific setting value. Each step is performed by the CPU 101 executing a control program stored in the ROM 102.

Figure 4A:
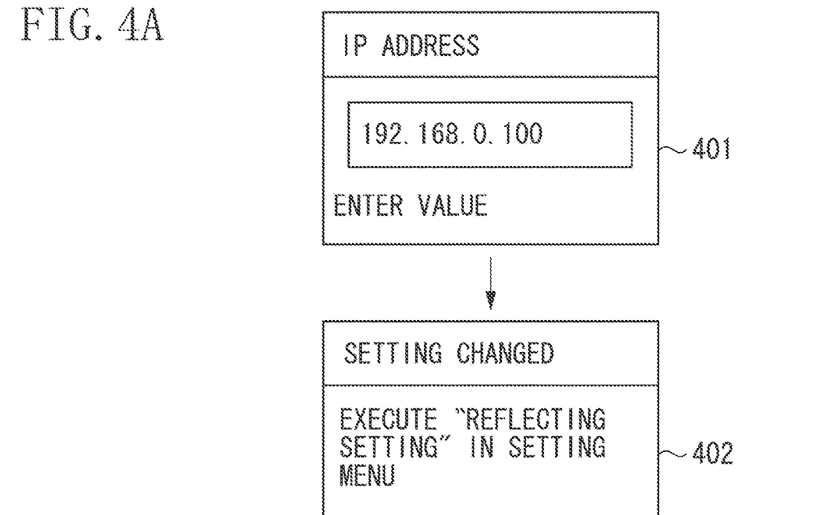
FIGS. 4A and 4B are diagrams showing UI screens displayed on an operation display unit according to one or more aspect of the present disclosure.
Figure 4B:
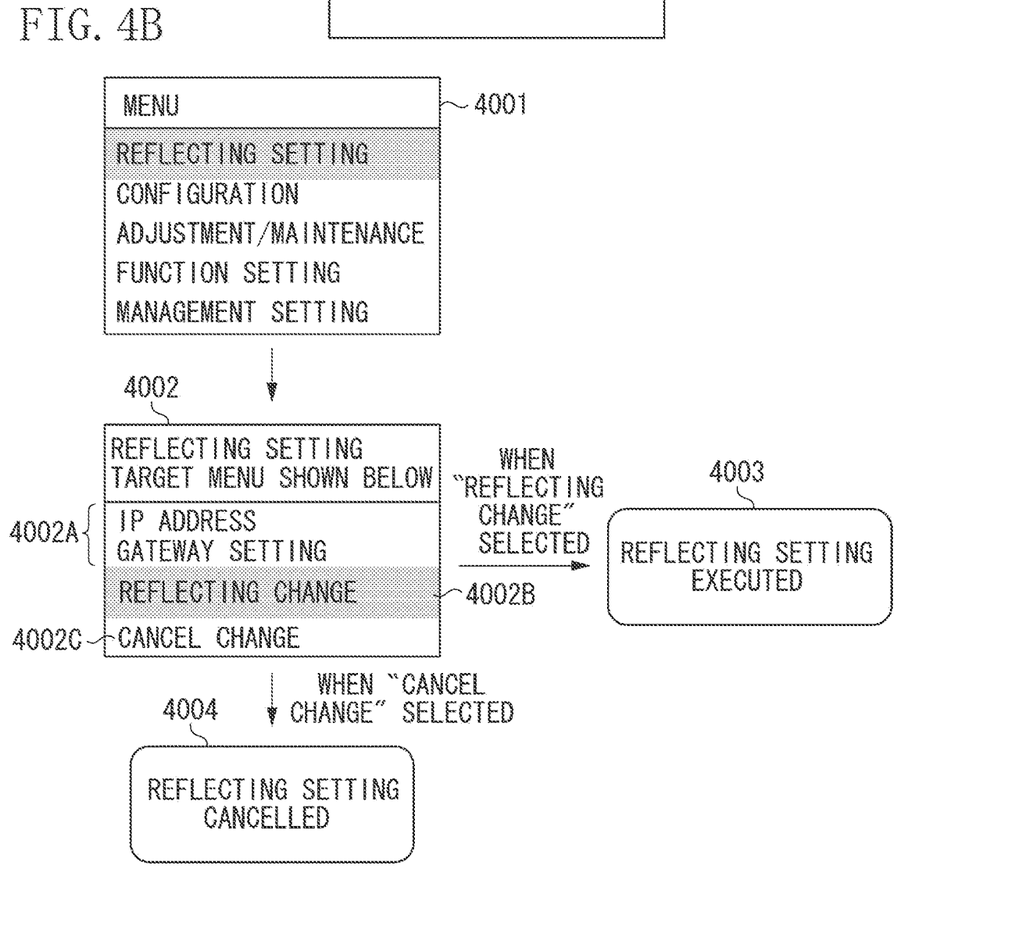

When a user presses a "reflecting setting" button displayed on the specific position in the operation display unit 105 in step S301, in step S302, the CPU 101 of the image processing apparatus 100 determines whether data is present on the setting value management table 2000. When the CPU 101 determines that the value is present in the setting value management table 2000 (Yes in step S302), in step S303, the setting value information in the setting value management table 2000 is displayed on the operation display unit 105 through the UI screen shown on FIG. 4 A. In the present embodiment, the specific position corresponds to the top-most hierarchical layer in the displayed menu on the operation display unit 105 (see FIG. 4 B 4001), in the case where setting items are placed in a layered fashion in the menu. However, the specific position is not limited to the above description.

Further, in step S304, the user selects whether a changed value is to be reflected or cancelled, and presses the button according to the selection. When the CPU 101 determines that "reflect" button is pressed ("reflect" in step S304), in step S305, the setting value in the setting value management table 2000 is rewritten and updated.

On the other hand, when the CPU 101 determines that "cancel" button is pressed ("cancel" in step S304), the updating process which rewrites the setting value is not executed.

In step S306, after "reflect" or "cancel" button is pressed, the data in the setting value management table 2000 is all cleared, and the present process is terminated.

When the CPU 101 determines that there is no such value in the setting value management table 2000 (No in step S302), no process is executed.

FIGS. 4A and 4B are diagrams illustrating a UI screen displayed on the operation display unit 105 shown in FIG. 1 according to one or more aspect of the present disclosure. Here, FIG. 4A shows a screen control example in which the reflecting or cancelling of the setting is collectively executed. FIG. 4 A corresponds to an example of changing an "IP address" setting in which the gateway setting has been already changed. A reception processing which continuously receives a plurality of setting values ("IP address" and "gateway setting") to be collectively changed will be described when it is determined that the specific item is the setting item to be changed.

In FIG. 4A, a user inputs any value and makes a determination, on an IP address input screen 401. The determined setting item and setting value are stored in the setting value management table 2000. Subsequently, the CPU 101 displays a screen 402 prompting reflecting of the setting on the operation display unit 105.

FIG. 4B corresponds to the case where the specific setting item is changed. In 4001, the CPU 101 displays a "reflecting setting" button at a specific menu hierarchical layer (a specific position at a top-most layer in this example). When the user presses the "reflecting setting" button, the CPU 101 displays 4002A including a list of changed setting items which are collectively processed, on a reflection executing screen 4002 corresponding to a setting list display screen.

Further, on the reflection executing screen 4002, a "change reflecting" button 4002B which collectively reflects changed values and a "cancel change" button 4002C which collectively cancels the changed content are displayed.

When a user selects "change reflecting" button in the setting reflection executing screen 4002, a setting reflecting notification screen 4003 is displayed on the operation display unit 105. When the "cancel change" button is selected in the setting reflection executing screen 4002, a screen 4004 notifying collective cancel of the setting is displayed on the operation display unit 105.

According to the present embodiment, setting items to be changed are successively displayed while the menu is manipulated, and a plurality of picked up setting items are all processed. Thus, for instance, the specific setting items displayed on the list 4002A can be collectively processed among the network settings.

In the present embodiment, the list 4002A, the "change reflecting" button 4002B, and "cancel change" button 4002C which collectively cancels a subject of the change are displayed on the identical screen. Here, the button 4002C corresponds to the setting abandoning button.

A second embodiment will be described as follow. While the first embodiment describes a control method regarding collective processing of the specific setting items among the settings on the network, a control method may be employed to prevent reflecting of the collective processing if a specific status is present.

Figure 5:
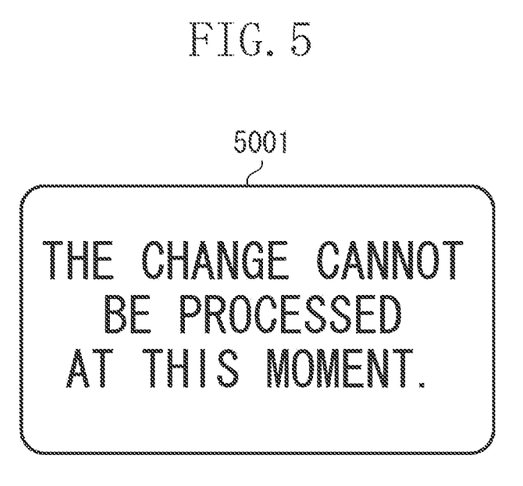
FIG. 5 is a diagram showing a UI screen displayed on the operation display unit according to one or more aspect of the present disclosure.

FIG. 5 is a diagram showing a UI screen displayed on the operation display unit 105 shown in FIG. 1.

The example shows an operation screen 5001 which notifies that the collective setting cannot be processed.

For instance, when a user reflects a setting during the print job processing, the operation screen 5001 is displayed so as to prevent the collective processing from interfering with the print job.

According to the present embodiment, one image processing apparatus can be safely shared without adverse effects on the print job in progress, in the collective processing of the specific setting items.

According to the present disclosure, the user interface can be provided which expressly specifies items to be changed in accordance with the change of a setting value of one item, and collectively reflects or abandons a plurality of entered setting values.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2015-230274, filed Nov. 26, 2015, which is hereby incorporated by reference herein in its entirety.

What is claimed is:

1. An information processing apparatus comprising:
a storage;
a memory storing instructions;
one or more processors which execute the instructions causing the information processing apparatus to:
display a setting value input screen;
accept a setting value through the setting value input screen;
determine, each time a setting value is accepted through the setting value input screen, whether a setting item of the accepted setting value is a specific item to be collectively changed;
store the accepted setting value in a table on the storage, in a case where it is determined that the setting item of the accepted setting value is the specific item;
display, in a case where it is determined that the setting item of the accepted setting value is the specific item, a prompt screen for prompting a user operation of reflecting of one or more setting values in the table;
display, according to a user input, a menu screen including plural kinds of menus, wherein, in the menu screen, a predetermined button for displaying a reflection executing screen is displayed in a case where it is determined that the setting item of the accepted setting value is the specific item;
determine, in a case where the predetermined button in the menu screen is selected, whether or not the one or more setting values are present in the table;
display the reflection executing screen in a case where the one or more setting values are present in the table, wherein the reflection executing screen includes a first button for reflecting the one or more setting values in the table and a second button for abandoning the one or more setting values; and
collectively abandon the one or more setting values in the table in a case where the second button is selected by a user.

2. The information processing apparatus according to claim 1, wherein the instructions further cause the information processing apparatus to display, on the reflection executing screen, a list of setting items of each of the setting values in the table with the first button and the second button.

3. The information processing apparatus according to claim 1, wherein the information processing apparatus includes an image processing apparatus, a printer, a facsimile apparatus, and a scanner.

4. A control method for the information processing apparatus having the display unit configured to display a menu and the storage configured to store a predetermined setting value, the control method comprising the steps of:

displaying a setting value input screen;

accepting a setting value through the setting value input screen;

determining, each time a setting value is accepted through the setting value input screen, whether a setting item of the accepted setting value is a specific item to be collectively changed;

storing the accepted setting value in a table on the storage, in a case where it is determined that the setting item of the accepted setting value is the specific item;

displaying, in a case where it is determined that the setting item of the accepted setting value is the specific item, a prompt screen for prompting a user operation of reflecting of one or more setting values in the table;

displaying, according to a user input, a menu screen including plural kinds of menus, wherein, in the menu screen, a predetermined button for displaying a reflection executing screen is displayed in a case where it is determined that the setting item of the accepted setting value is the specific item;

determining, in a case where the predetermined button in the menu screen is selected, whether or not the one or more setting values are present in the table;

displaying, the reflection executing screen in a case where the one or more setting values are present in the table, wherein the reflection executing screen includes a first button for reflecting the one or more setting values in the table and a second button for abandoning the one or more setting values; and collectively abandoning the one or more setting values in the table in a case where the second button is selected by a user.

5. A non-transitory computer readable storage medium storing a program for causing a computer to perform a control method for the information processing apparatus, the information processing apparatus having the display unit configured to display a menu and the storage to store a predetermined setting value, wherein the control method comprises the steps of:

displaying a setting value input screen;

accepting a setting value through the setting value input screen;

determining, each time a setting value is accepted through the setting value input screen, whether a setting item of the accepted setting value is a specific item to be collectively changed;

storing the accepted setting value in a table on the storage, in a case where it is determined that the setting item of the accepted setting value is the specific item;

displaying, in a case where it is determined that the setting item of the accepted setting value is the specific item, a prompt screen for prompting a user operation of reflecting of one or more setting values in the table;

displaying, according to a user input, a menu screen including plural kinds of menus, wherein, in the menu screen, a predetermined button for displaying a reflection executing screen is displayed in a case where it is determined that the setting item of the accepted setting value is the specific item;

determining, in a case where the predetermined button in the menu screen is selected, whether or not the one or more setting values are present in the table;

displaying, the reflection executing screen in a case where the one or more setting values are present in the table, wherein the reflection executing screen includes a first button for reflecting the one or more setting values in the table and a second button for abandoning the one or more setting values; and collectively abandoning the one or more setting values in the table in a case where the second button is selected by a user.

6. The information processing apparatus according to claim 1, wherein the instructions further cause the information processing apparatus to notify the user of an execution of a reflection of the one or more setting values in the table in a case where the first button is selected by the user.

* * * * *